(12) United States Patent
Zhao

(10) Patent No.: US 12,397,781 B2
(45) Date of Patent: Aug. 26, 2025

(54) SYSTEM AND METHOD FOR CONTROLLING VEHICLE

(71) Applicant: JINAN ZHENZHEN TECHNOLOGY RESEARCH INSTITUTE, Jinan (CN)

(72) Inventor: Tingting Zhao, Beijing (CN)

(73) Assignee: JINAN ZHENZHEN TECHNOLOGY RESEARCH INSTITUTE, Jinan (CN)

( * ) Notice: Subject to any disclaimer, the term of this patent is extended or adjusted under 35 U.S.C. 154(b) by 0 days.

(21) Appl. No.: 17/636,505

(22) PCT Filed: Sep. 4, 2019

(86) PCT No.: PCT/CN2019/104444
§ 371 (c)(1),
(2) Date: Oct. 4, 2022

(87) PCT Pub. No.: WO2020/011281
PCT Pub. Date: Jan. 16, 2020

(65) Prior Publication Data
US 2024/0217509 A1    Jul. 4, 2024

(51) Int. Cl.
*B60W 30/09* (2012.01)
*B60W 30/16* (2020.01)

(52) U.S. Cl.
CPC .......... *B60W 30/09* (2013.01); *B60W 30/162* (2013.01); *B60W 2554/4029* (2020.02); *B60W 2554/404* (2020.02); *B60W 2554/801* (2020.02)

(58) Field of Classification Search
CPC .............. B60W 30/09; B60W 30/162; B60W 2554/4029; B60W 2554/404;
(Continued)

(56) References Cited

U.S. PATENT DOCUMENTS 8,798,841 B1    8/2014 Nickolaou et al.
10,146,223 B1    12/2018 Luders et al.
(Continued)

FOREIGN PATENT DOCUMENTS

CN    102428505 A    4/2012
CN    102991416 A    3/2013
(Continued)

OTHER PUBLICATIONS

Notice of Allowance from Chinese Patent Application No. 201980025936.0 dated May 6, 2022, and its English translation from Global Dossier.
(Continued)

*Primary Examiner* — Mussa A Shaawat
(74) *Attorney, Agent, or Firm* — Ladas & Parry, LLP

(57) ABSTRACT

A system and method for controlling a vehicle to perform safety action, the system comprises: a lateral blind zone detection module (201) configured to detect a lateral blind zone (105) of a first vehicle (101) caused by a second vehicle (102) in the lateral direction of the first vehicle (101); a movement characteristic monitor module (202) configured to monitor movement characteristic of the second vehicle (102) in response to the lateral blind zone (105) detected; and a safety action module (203) configured to control the first vehicle (101) to perform at least one safety action based on the monitored movement characteristics of the second vehicle (102). The system and method can avoid collision and improve safety.

13 Claims, 6 Drawing Sheets

(58) Field of Classification Search
CPC ....... B60W 2554/801; B60W 2520/10; B60W 2720/10; B60W 2754/50; B60W 30/143; B60W 30/0956; B60W 50/0098; B60W 40/04; B60W 2554/80; G06V 20/58
See application file for complete search history.

(56) References Cited

U.S. PATENT DOCUMENTS

| | | | | |
|---|---|---|---|---|
| 10,457,278 | B2* | 10/2019 | Miyata | B60W 60/00274 |
| 2006/0025918 | A1* | 2/2006 | Saeki | B60W 10/06 701/96 |
| 2008/0036576 | A1* | 2/2008 | Stein | G06V 20/58 340/425.5 |
| 2016/0311464 | A1* | 10/2016 | Yamaoka | B62D 15/0255 |
| 2017/0101092 | A1* | 4/2017 | Nguyen Van | G01S 13/931 |
| 2017/0357859 | A1* | 12/2017 | Jain | G06V 40/161 |
| 2017/0357863 | A1* | 12/2017 | Tsuruta | G06T 7/254 |
| 2018/0190124 | A1 | 7/2018 | Kim et al. | |
| 2018/0261095 | A1 | 9/2018 | Qiu et al. | |
| 2018/0272944 | A1* | 9/2018 | Goncalves | H04N 7/181 |
| 2018/0286248 | A1 | 10/2018 | Choi et al. | |
| 2018/0292822 | A1* | 10/2018 | Ichikawa | G05D 1/0257 |
| 2019/0106103 | A1* | 4/2019 | Inoue | B60K 31/02 |
| 2019/0126923 | A1 | 5/2019 | Taie et al. | |
| 2019/0243371 | A1* | 8/2019 | Nister | G05D 1/65 |
| 2019/0351823 | A1* | 11/2019 | Van Der Meijs | B60K 35/81 |
| 2020/0160717 | A1* | 5/2020 | He | G08G 1/167 |
| 2020/0331467 | A1* | 10/2020 | Ohmura | B60W 10/18 |
| 2020/0398866 | A1* | 12/2020 | Hara | B60W 50/14 |
| 2021/0263159 | A1* | 8/2021 | Zhu | G01S 15/86 |
| 2021/0309216 | A1* | 10/2021 | Pantano-De-Luca | B62D 15/0285 |
| 2021/0394775 | A1* | 12/2021 | Julian | B60W 50/14 |
| 2023/0135234 | A1* | 5/2023 | Wang | G06V 10/774 382/103 |
| 2023/0136235 | A1* | 5/2023 | Wang | G06V 20/64 701/23 |

FOREIGN PATENT DOCUMENTS

| | | |
|---|---|---|
| CN | 104240538 | 12/2014 |
| CN | 104240538 A | 12/2014 |
| CN | 104827966 A | 8/2015 |
| CN | 106696967 | 5/2017 |
| CN | 106696967 A | 5/2017 |
| CN | 107487258 | 12/2017 |
| CN | 107487258 A | 12/2017 |
| CN | 108638952 A | 10/2018 |
| CN | 109532829 | 3/2019 |
| CN | 109532829 A | 3/2019 |
| CN | 109835253 A | 6/2019 |
| CN | 109979238 | 7/2019 |
| CN | 109979238 A | 7/2019 |
| CN | 110059574 | 7/2019 |
| CN | 110059574 A | 7/2019 |
| EP | 3273423 A1 | 1/2018 |
| GB | 2553616 A | 3/2018 |
| JP | 2006205860 A | 8/2006 |
| JP | 2011-164760 | 8/2011 |
| JP | 2011164760 A | 8/2011 |
| JP | 2017-114405 | 6/2017 |
| JP | 2017111680 A | 6/2017 |
| JP | 2017114405 A | 6/2017 |
| WO | 2017128194 A1 | 8/2017 |

OTHER PUBLICATIONS

Office Action from Chinese Patent Application No. 201980025936.0 dated Jan. 6, 2022 with search report, and its English translation from Global Dossier.
PCT International Preliminary Report on Patentability (Chapter I) from PCT/CN2019/104444 dated Mar. 8, 2022.
PCT Written Opinion from PCT/CN2019/104444 dated May 27, 2020.
PCT Search Report from PCT/CN2019/104444 dated May 27, 2020.

* cited by examiner

SYSTEM AND METHOD FOR CONTROLLING VEHICLE

CROSS-REFERENCE TO RELATED APPLICATION

The application is a national phase application of the PCT application No. PCT/CN/2019/104444 filed on Sep. 4, 2019, the disclosure of which is incorporated herein by reference in its entirety.

TECHNICAL FIELD

The present disclosure relates to a system and method for controlling vehicle.

BACKGROUND

Vehicles safety performance is receiving wide attention. Anti-collision system has been developed for detecting dangerous object that are visible/detectable to the vehicle.

However, dangerous object in lateral direction of the vehicle may hide behind another vehicle, such that the object may not be detected by the vehicle until it suddenly appears in front of the vehicle. Short reaction times may cause collisions.

SUMMARY

An aspect of the present disclosure is a system for controlling a vehicle to perform a safety action, the system comprising: a lateral blind zone detection module configured to determine that a lateral blind zone of a first vehicle is formed due to obscuration by a second vehicle in a lateral direction of the first vehicle; a movement characteristic monitor module configured to monitor movement characteristic of the second vehicle in response to the lateral blind zone being determined; and a safety action module configured to control the first vehicle to perform a safety action based on the monitored movement characteristic of the second vehicle.

Another aspect of the present disclosure is a method of controlling a vehicle to perform a safety action, the method comprising: detecting a lateral blind zone of a first vehicle obscured by a second vehicle in a lateral direction of the first vehicle; monitoring movement characteristic of the second vehicle in response to the lateral blind zone of the first vehicle is detected; and controlling the first vehicle to perform safety action based on the monitored movement characteristic of the second vehicle.

Further another aspect of the present disclosure is a machine readable medium storing instructions thereon, wherein the instructions when executed by a processor, causing the processor to: detecting a lateral blind zone of a first vehicle obscured by a second vehicle in a lateral direction of the first vehicle; monitoring movement characteristic of the second vehicle in response to the lateral blind zone of the first vehicle is detected; and controlling the first vehicle to perform safety action based on the monitored movement characteristic of the second vehicle.

Figure 1A:
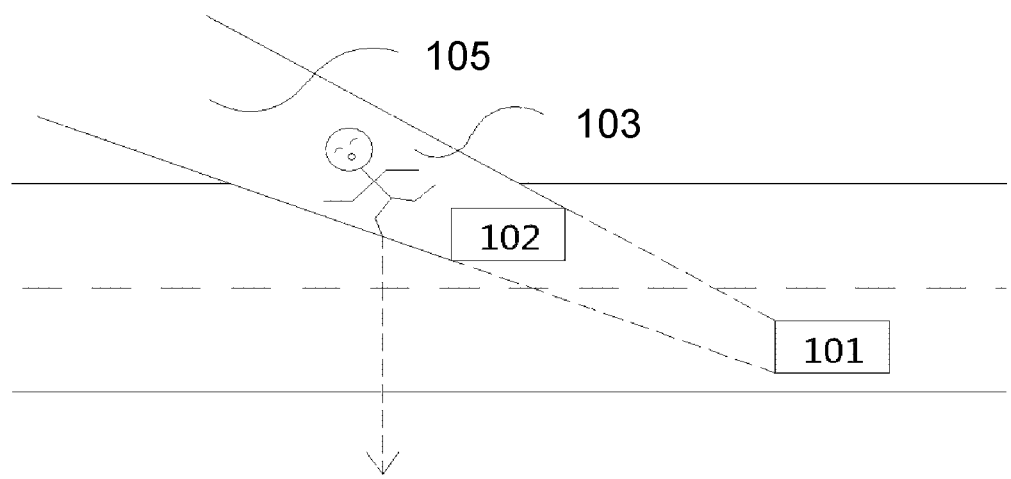
FIG. 1 (1A-1C) illustrates an example of a dangerous event.

Same reference sign in the drawings and the descriptions designates same or similar element. The drawings are only for illustrative purposes and not to scale.

DETAILED DESCRIPTION

A vehicle may have a lateral blind zone due to obscuration of other vehicles in its lateral direction. Dangerous object may exist in the lateral blind zone. It is difficult for the vehicle's sensors or the driver to detect/observe such an object.

Figure 1B:
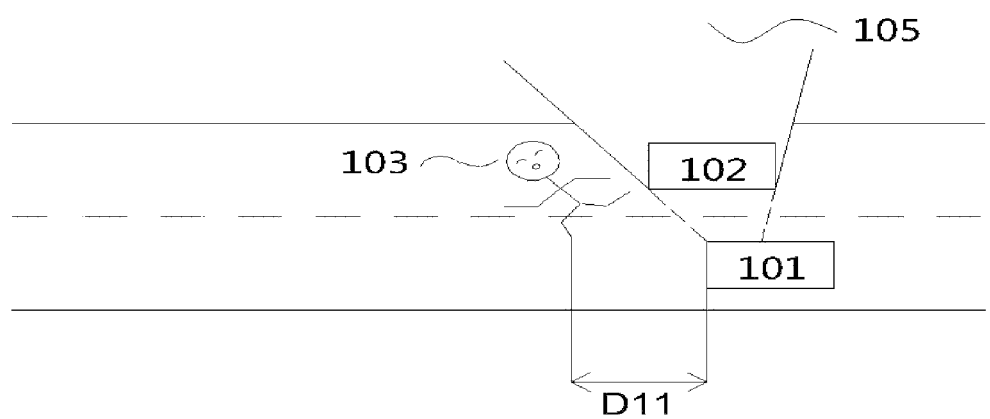
Figure 1C:
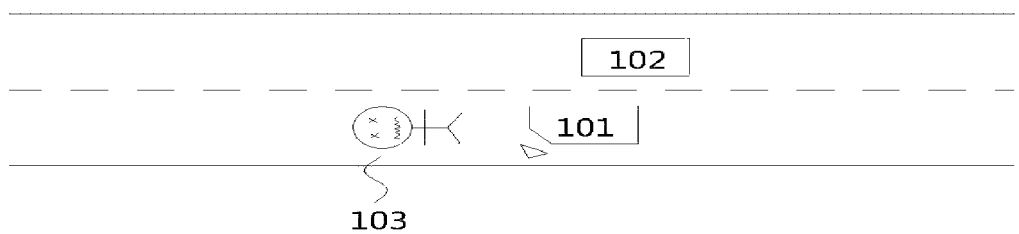

Refer to FIG. 1, a second vehicle 102 causes a lateral blind zone 105 for the first vehicle 101. At the time point of FIG. 1A, there is an object 103 in the lateral blind area 105 moving attempt to cross the road. At the time point of FIG. 1B, the object 103 leaves the lateral blind zone 105 and being detectable or visible for the first vehicle. However, the reaction distance D11 does not allow the first vehicle 101 to perform an effective safety action. As a result, a collision occurs at the time point of FIG. 1C.

The present disclosure provides a system and method for avoiding collision for the first vehicle 101 with object 103 from lateral blind zone 105, and a machine readable storage storing thereon instructions for implementing the present disclosure.

The second vehicle of the present disclosure may be a vehicle that moves in an adjacent/side lane/movement trace of the first vehicle. The second vehicle causes an obscuration of the first vehicle in a lateral direction. The movement trace of the second vehicle (including its current or future positions) may not intersect the movement trace of the first vehicle (including its future positions). In other words, the second vehicle does not impede the movement of the first vehicle.

Figure 2A:
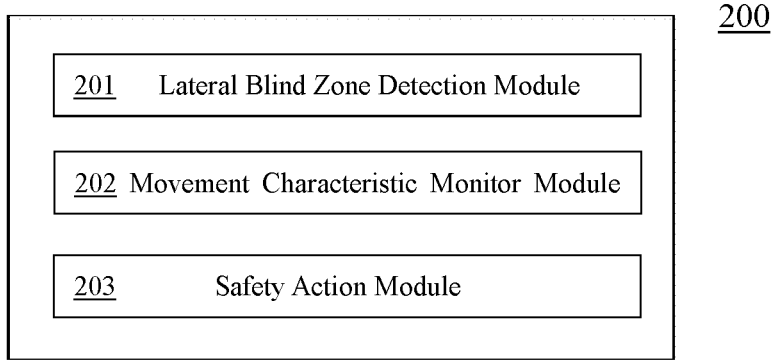
FIG. 2 (2A-2C) illustrates a system for controlling vehicle to perform safe action an embodiment of the present disclosure.

As shown in FIG. 2A, the system 200 may include a lateral blind zone detection module 201, a movement characteristic monitor module 202 and a safety action module 203.

The blind zone detection module 201 may be configured to detect a lateral blind zone 105 caused by the second vehicle 102 in the lateral direction of the first vehicle 101. In an embodiment, the lateral blind zone detection module 201 may include any device that is capable of recognizing an obscuration in lateral direction of the first vehicle such as camera, radar. The lateral blind zone detection module may detect the area or range of view angles of the blind zone obscured by the second vehicle. In another embodiment, the lateral blind zone detection module may determine the blind zone in an estimated manner based on detecting the distance from the first vehicle to the second vehicle.

A threshold may be set for determining or detecting the blind zone. For example, a lateral blind zone may be determined upon the obscured area or obscured angles of view reaches a particular threshold. Also, the lateral blind zone may be determined upon the distance from the first vehicle to the second vehicle is less than a specific distance (e.g., 10 meters). The distance that triggers the determination of the lateral blind zone may vary with respect to e.g., the speed of the first or second vehicle. Other implantation for the lateral blind zone detection module may also be employed.

The movement characteristic monitor module 202 may be configured to monitor the movement characteristics of the second vehicle in response to the determination of the blind zone 105. The movement characteristics herein may comprise but not limited to: the speed of the second vehicle relative to the earth, the changing rate of the second vehicle relative to the earth (first derivative for speed versus time), and the changing rate of acceleration of the second vehicle (second derivative for speed versus time). The movement characteristics herein may also comprises positions of the second vehicle at future time points calculated based on any monitored factors.

The movement characteristic monitor module 202 may be implemented as a vision-based camera, a radar based on transmitting and receiving pulses, including any processor performing associated computing functions, or any combination thereof. The movement characteristic monitor module 202 may share sensors (such as camera and/or radar) with the blind zone detection module 201. The monitor module 202 is not limited thereto, as long as the movement characteristics of the second vehicle comprising information about the positions/speeds relative to time may be acquired.

The movement characteristics of the second vehicle may be calculated by a processor of the first vehicle based on the detected position/speed of the second vehicle relative to the first vehicle and the position/speed of the first vehicle itself. The movement characteristics of the second vehicle may also be obtained from analysis of a video stream/image frames captured by a visual component of the first vehicle.

The movement characteristics may be estimated (using fitting function) based on single sampling with particular frequency matching or proportional to the frequency of radar for transmitting/receiving pulses and/or frame frequencies of camera. The number of second vehicle being monitored may be one or more.

The safety action module 203 may be configured to control the first vehicle to perform at least one safety action based on a movement characteristic of the second vehicle, intending to avoid collision with dangerous object from the lateral blind zone obscured by the second vehicle.

Examples of the safety actions herein may include but not limited to: (1) controlling the speed of the first vehicle so that the speed difference between the first vehicle and the second vehicle being within a desired difference; (2) controlling the speed of the first vehicle so that the first vehicle does not overtake the second vehicle; (3) using at least one of light, sound and vibration to alert the driver of the first vehicle; (4) causing the first vehicle to whistle; (5) flashing the high beam of the first vehicle; (6) flashing the double yellow light on the end of the first vehicle; (7) flashing the brake light of the first vehicle; (8) focusing at least one resource of the first vehicle on an area adjacent to the lateral blind zone; and (9) allocating more resources to a detection device on the first vehicle that capable of minimizing the lateral blind zone.

Accordingly, the safety action module may send instructions to device/element of the first vehicle relative to speed control, such as brake system, electrical kinetic energy recovery system, acceleration system and ECU of the vehicle, etc. The safety action module may also directly include the devices/elements (such as brake system) of the first vehicle relative to speed. In addition, the safety action module may also comprise device alerting the driver of the first vehicle, such as lights device, vibrating device, sound device, etc.

The safety action module may send instructions/commands to the unit or resource of the first vehicle to focus resources on the area adjacent to the blind zone, thereby increasing the responsiveness of the first vehicle to the object from the blind zone. For example, trying to find potential objects, the safety action module may instruct a processor to allocate more computing resources to a part of an environment model constructed with image frames or radar echo, the part representing an area of the environment model which near the blind zone. For example, the safety action module may instruct one or more cameras to focus their focal point and/or instruct one or more radars to focus their orientation to the lateral blind zone. For example, more resources, such as computing resources, may be allocated to the detection device (e.g., radar or visual cameras) which is oriented toward the blind zone. For example, a detection device that is furthest from the second vehicle among a plurality of front row detection devices on the first vehicle may be allocated with more resources, as it is capable of minimizing the blind zone.

In an embodiment, the speed difference between the first and second vehicles may be controlled to be a desired speed difference that allows for the first vehicle to deceleration to avoid collisions. The desired difference may be adjusted based on the movement characteristics of the second vehicle. For example, if the movement characteristic indicates that the second vehicle is decelerating at the first amplitude, the speed difference may be controlled within a first difference, and if the movement characteristic indicates that the second vehicle is decelerating at a second amplitude higher than the first amplitude, the speed difference may be controlled within a second difference smaller than the first difference.

In an embodiment, in response to the movement characteristic monitor module installed on the first vehicle monitors that the value of deceleration (braking) of the second vehicle exceeds a predefined deceleration threshold or the value of the changing rate of deceleration of the second vehicle exceeds a predefined changing rate, the safety action module may controls the speed of the first vehicle. For example, if the value of deceleration of the second vehicle exceeds a predefined deceleration threshold, the speed of the first vehicle may be controlled so that the first vehicle does not overtake the second vehicle. The predefined deceleration threshold may be selected from 0.3 to 1.1 G (0.3 to 1.1 times of the Gravitational acceleration). Preferably, 0.7 G may be selected as the predefined deceleration threshold.

The safety action may also comprises transmitting, via an output interface, information to other component of the first vehicle and/or to object external to the first vehicle, the information may be either the information describing the monitored movement characteristic or the information indicating that there is a potential dangerous object in the lateral blind zone. This information may be sent to other components of the first vehicle and/or sent to other recipients via the network, such as other vehicles or cloud service platforms.

The lateral blind zone detection module 201, the movement characteristic monitor module 202 and the safety action module 203 may communicate with each other in wired or wireless manner, and may be mounted together on the first vehicle such that the first vehicle 101 has complete and independent capability for avoiding collision with an object from a lateral blind zone. In this case, the present disclosure may be implemented without communication between the first vehicle and the second vehicle (this does not exclude the embodiment in which the first and second vehicles may communicate with each other). This is advantageous because communication between different vehicles may require additional costs such as link delay, hardware matching and communication protocols between different manufacturers.

Figure 3A:
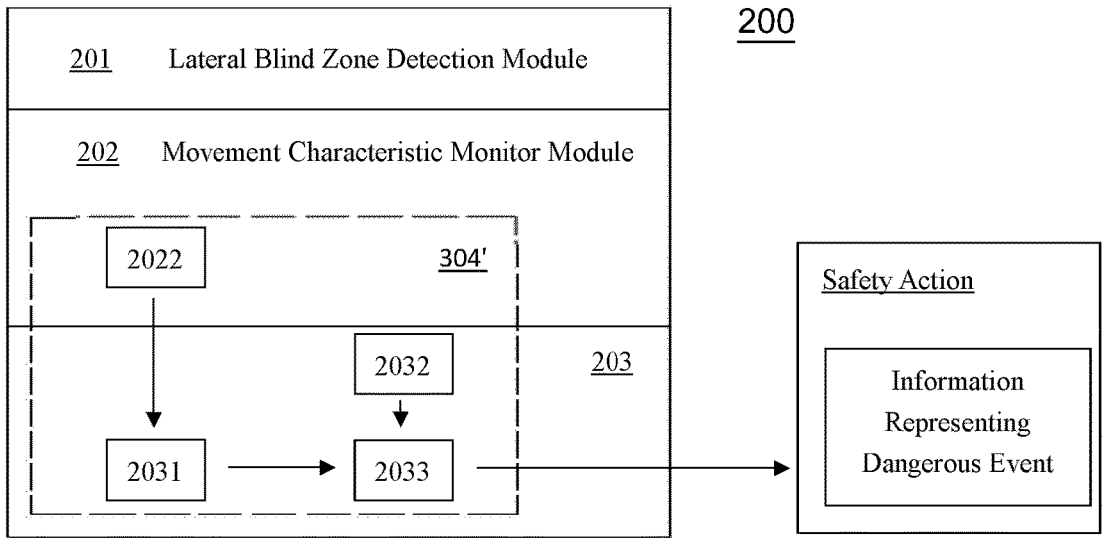
FIG. 3 (3A-3B) illustrates an example system for controlling vehicle to perform safety action according to the present disclosure.

As shown in the dashed block in FIG. 3A, the system 200 may include a lateral blind zone event evaluation module 304' configured to evaluate a dangerous event in the blind zone 105 based on the monitored movement characteristics of the second vehicle. In an embodiment, a part of the elements of the lateral blind zone event evaluation module 304' may be identical to a part of the components of the movement characteristic monitor module, while other components may be identical to a part of the elements of the components of the safety action module. For example, the information indicative of the movement characteristics of the second vehicle may be transmitted from an output port 2022 of the movement characteristic monitor module to the input port 2031 of the safety action module. A mapping between the movement characteristic(s) of the second vehicle and the evaluated dangerous event(s), such as a lookup table or code describing the input/output equation, may be stored in the memory 2032 of the safety action module. The processor of 2033 the safety action module may evaluate potential dangerous events in the lateral blind zone by e.g., retrieving in the lookup table from memory 2032 based on the received (at input port 2031) information representative of the movement characteristic. In this case, the elements of the movement characteristic monitor module and the safety action module associated with this evaluation may be considered in combination as a lateral blind zone event evaluation module 304'. The safety action module 203 may then output information representing the dangerous event based on this evaluation. In this case, outputting the information representing the dangerous event is a safety action performed by the safety action module.

Figure 3B:
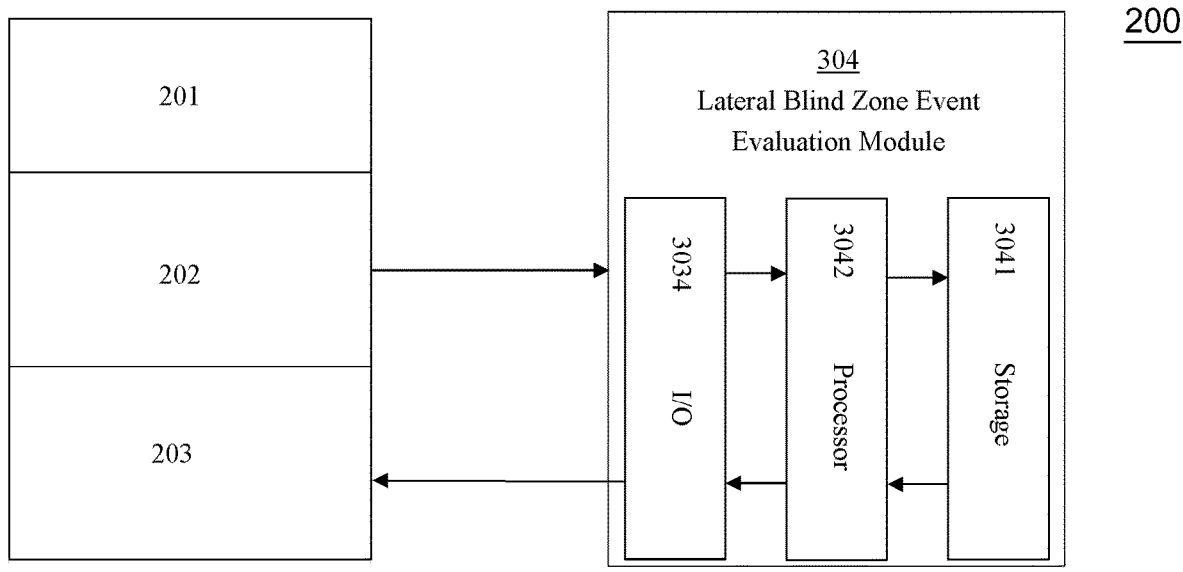

In an embodiment, the system 200 may comprise an independent lateral blind zone event evaluation module 304, as shown in FIG. 3B. The lateral blind zone event evaluation module 304 may include separate storage 3041 (e.g., for storing a mapping between movement characteristics and dangerous events), a processor 3042, and input/output interface 3043. The lateral blind zone evaluation module 304 may receive information representing the movement characteristic via the input/output interface 3043, and the processor 3042 may process the received presentation of the movement characteristic according to a mapping (such as lookup table and/or equation code) between movement characteristics and dangerous events to acquire representation of estimated dangerous event. The information representing the evaluated dangerous event may be sent to the safety action module via the input/output interface 3043. The safety action module then controls the first vehicle to perform safety action based on the evaluated dangerous event.

In an embodiment, the lateral blind zone event evaluation module may communicate with other component/module of the first vehicle or external object. For example, the lateral blind zone event evaluation module may know, via communication, that the first vehicle is located in a zone in which pedestrian crossing often occur, and thus increases the level of event evaluation.

Figure 2B:
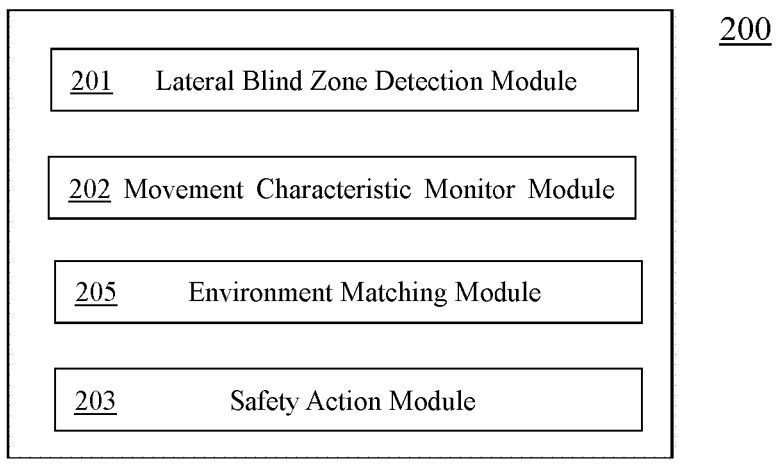

As shown in FIG. 2B, the system 200 may further include an environment matching module 205. The environment matching module 205 may be installed on the first vehicle and may be configured to detect a part of the environment of the second vehicle that is visible or detectable to the first vehicle. In other words, the detected environment does not include the part of the environment of the second vehicle that is in the lateral blind zone.

The environment matching module 205 may be further configured to determine a matching level between the movement characteristic of the second vehicle and the detected environment. And the safety action module 203 may select and perform a particular level of safety action from a plurality of different levels of safety actions based on the determined matching level.

Figure 4A:
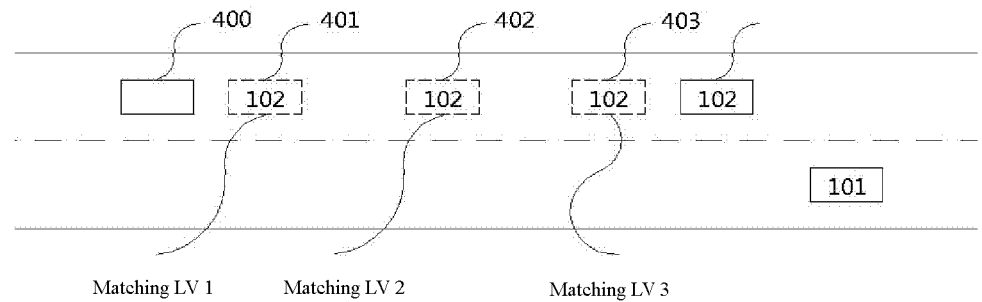
FIG. 4 (4A-4C) illustrates an example principle for an environmental matcher according to the present disclosure.

As shown in FIG. 4A, for example, the environment matching module may detects that an obstacle is present at 50 meters ahead the second vehicle (position 400).

For example, if the monitored movement characteristic indicates that the second vehicle will stop after moving 45 meters (position 401), the environment matching module 205 may determine the movement characteristic matches the environment at a first level. In this case, the safety action module 203 may control the first vehicle to perform a first level of safety action corresponding to no dangerous object is present in the blind zone. For example, the safety action module may not decelerate the first vehicle based on this movement characteristic or may not alert the driver of the first vehicle.

For example, if the movement of the monitored second vehicle is characterized in that the second vehicle will stop after moving 25 meters (at position 402), the environment matching module 205 may determine that the movement characteristic matches the environment at a second level which is lower than the first level. In this case, the safety action module 203 may control the first vehicle to perform a second level of safety action which is higher than the first level. For example, the safety action module may decelerate the first vehicle at first amplitude, or to warn the driver of the first vehicle using a yellow warning light.

For example, if the monitored movement of the second vehicle is characterized in that the second vehicle will a stop after moving 5 meters (at position 403), the environment matching module may determine that the movement characteristic matches the environment at a third level which is lower than the second level. In this case, the safety action module 203 may control the first vehicle to perform a third level of safety action. For example, the safety action module may decelerate the first vehicle at greater amplitude such that the first vehicle does not overtake the second vehicle. Also, the driver may be alerted with at least one of red warning light, sound and vibration.

Different levels of safety actions may be different in many aspects. For example, the second level of safety action may refer to a safety action with a magnitude of deceleration greater than the first level. As another example, a second level of safety action may perform a wider variety of actions than a first level of safety action.

Figure 4B:
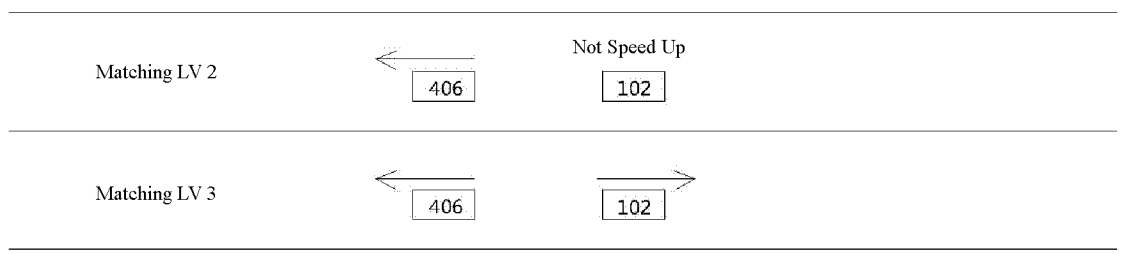

The detected environment of the second vehicle may also comprise the movement characteristics of third vehicle(s) 406 in front of the second vehicle 102 in the queue, as shown in FIG. 4B.

In an embodiment, the safety action module may be configured to: in response to a front third vehicle increasing speed (indicated as forward arrow) and the second vehicle does not increasing speed (e.g., matching level 2), controlling the first vehicle to perform a first level of safety action, for example, suppressing the acceleration amplitude of the first vehicle and/or using a yellow light to warn the driver; and in response to the second vehicle turn to reduces its speed (indicated as backward arrow) after increasing speed following the third vehicle, while the third vehicle has not reduce speed (e.g., matching level 3), controlling the first vehicle to perform a second level of safety action such as deceleration and/or warning the driver with red light.

Figure 4C:
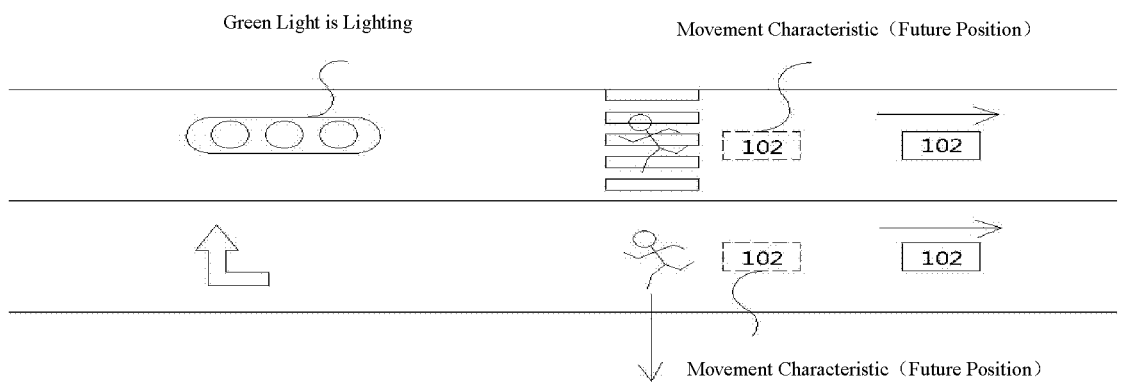

As shown in FIG. 4C, the detected environment of the second vehicle may also comprises traffic signs for the second vehicle, such as a signal light, speed limit signs, marker for tuning, or other indication. The safety action module may controls the first vehicle 102 to perform safety action based on the matching level between movement characteristic and signs. For example, the safety action may be performed upon (1) the second vehicle does not increase speed or even decelerate, while the green light for the lane of the second vehicle is lighting, or (2) the movement of the second vehicle is characterized in that it will stop after 10 meters, while the turning marker is detected (e.g., by a camera of environment matching module 205) being 80 meters ahead away.

In addition to the above examples, the detected environment may comprise any factors that may cause the second vehicle to perform a particular movement characteristic such as deceleration. The environment detection may also comprise detecting the turning light of the second vehicle.

Figure 2C:
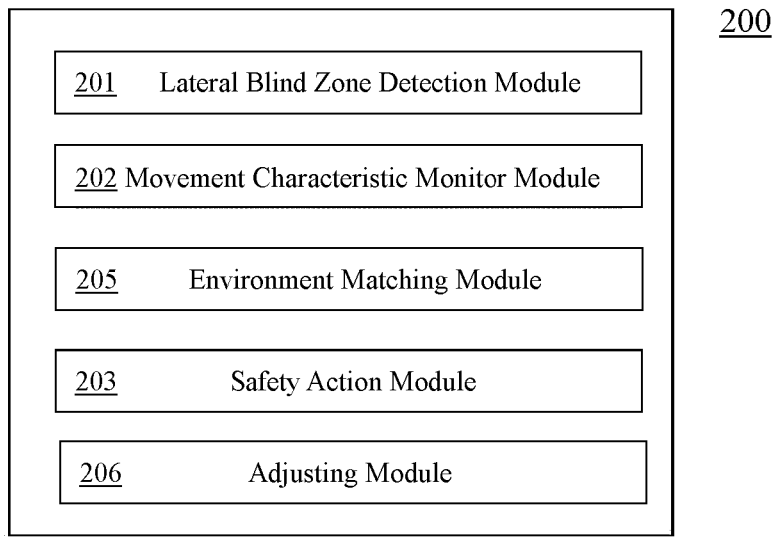

As shown in FIG. 2C, the system 200 may further comprises an adjusting module 206 configured to adjust the mapping between the safety actions and the movement characteristics. The mapping adjustment may comprises adjusting the mapping between the movement characteristics and the estimated dangerous events (e.g., the mapping stored in the blind zone event evaluation module), and/or adjusting the mapping between the estimated dangerous events and the safety actions (e.g., the mapping stored in the safety action module).

The adjusting module may automatically adjust the mapping based on predefined policies. For example, when the first vehicle 101 is in an area where pedestrians crossing often occur, the adjusting module 206 may cause a particular movement characteristic to correspond to a higher level of safe action. The adjusting module may also adjust the mapping based on user input. For example, when the user selects "safe mode", the adjusting module may cause particular movement characteristic to correspond to a higher level of safety action. For example, when the user selects "sport mode" or "speed mode", the adjusting module may cause a particular movement characteristic to correspond to a lower level of safety action.

Figure 5A:
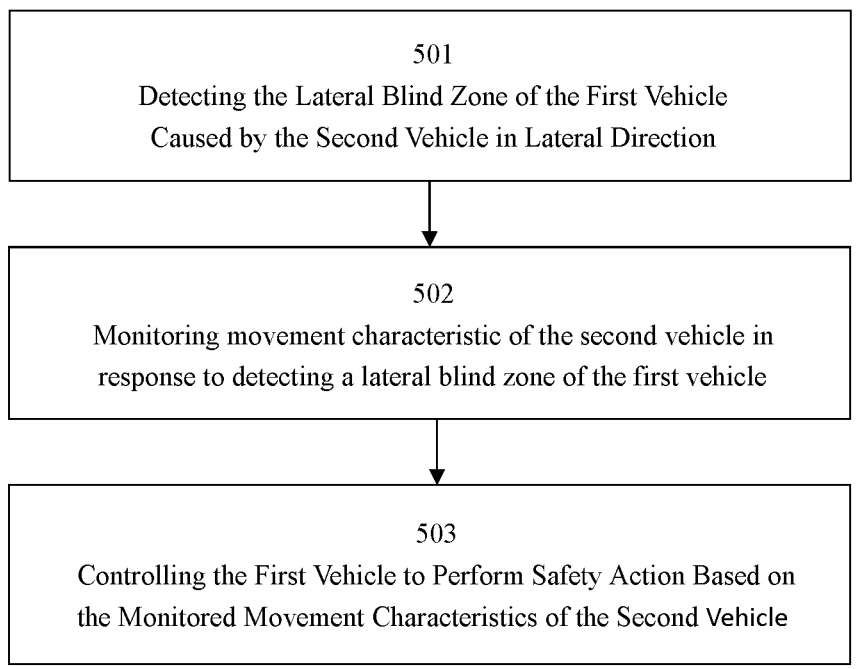
FIG. 5 (5A-5B) illustrates an example method for controlling vehicle to perform safety action according to the present disclosure.

FIG. 5 (5A and 5B) illustrates a method of controlling a first vehicle to perform a safety action according to the present disclosure. At 501, a lateral blind zone of the first vehicle caused by the second vehicle in a lateral direction is detected. At 502, a movement characteristic of the second vehicle is monitored in response to detecting a lateral blind zone of the first vehicle. At 503, the first vehicle is controlled to perform a safety action based on the monitored movement characteristics of the second vehicle.

Figure 5B:
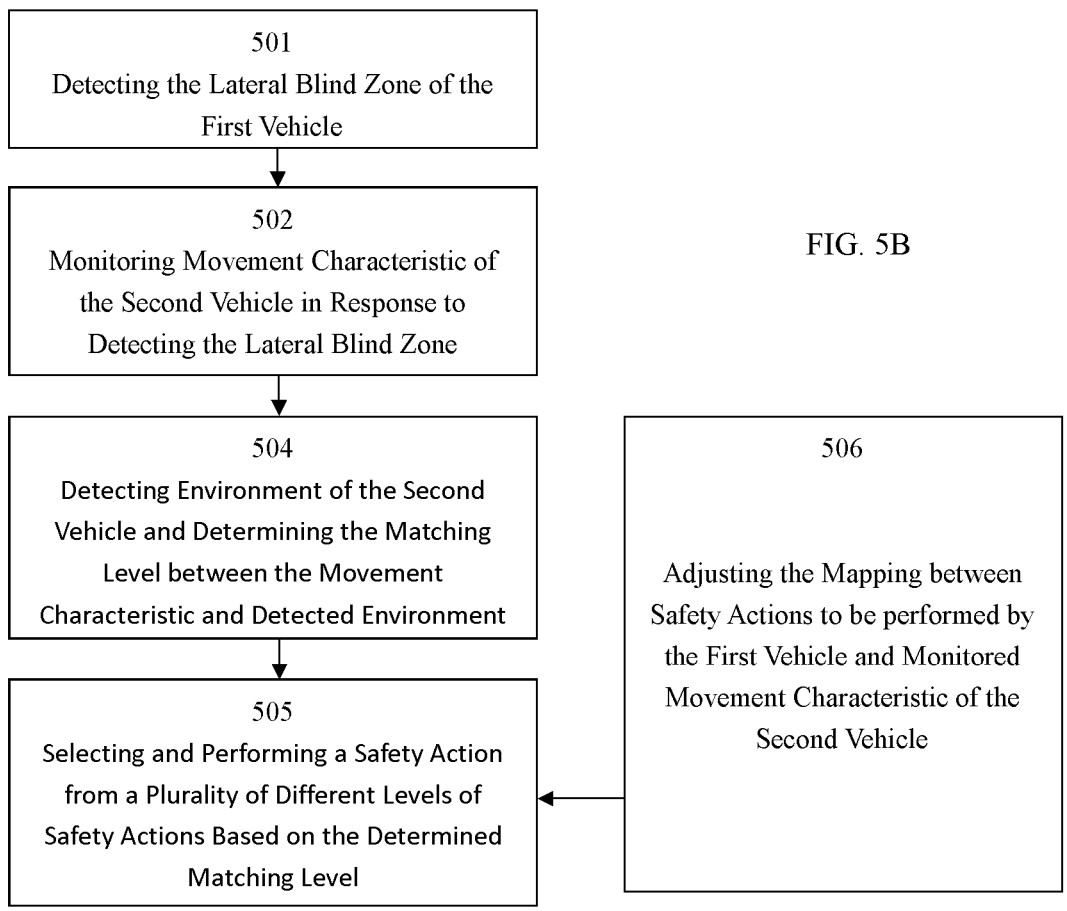

As shown in FIG. 5B, the method further comprises at 504 detecting the environment of the second vehicle and determining the matching level between the movement characteristic of the second vehicle and the detected environment, wherein the detected environment is the part of the environment which visible to the first vehicle. The method may further comprise, at 505, selecting and performing a particular level of safety action from a plurality of different levels of safety actions based on the determined matching level. The method also may comprises, at 506, adjusting the mapping between a safety action to be performed by the first vehicle and a movement characteristic of the second vehicle based on current setting by the user input or a predefined policy.

The present disclosure also comprises a machine readable medium storing a set of instructions that, when executed by a processor, cause the processor to perform the method of the present disclosure.

Figure 6A:
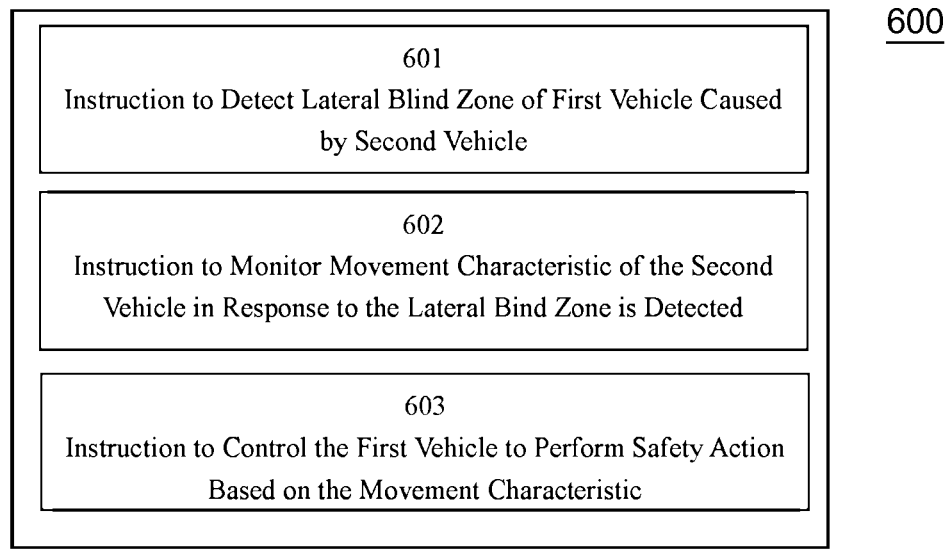
FIG. 6 (6A-6B) illustrates a non-transitory machine readable medium according to the present disclosure.

As shown in FIG. 6A, the non-transitory machine readable medium 600 according to the present disclosure may includes: instruction 601 to detect a lateral blind zone of a first vehicle caused by a second vehicle on a side of the first vehicle; instruction 602 to monitor the movement characteristic of the second vehicle in response to the lateral blind zone of the first vehicle is detected; and instruction 603 to control the first vehicle to perform safety action based on the movement characteristic of the second vehicle.

Figure 6B:
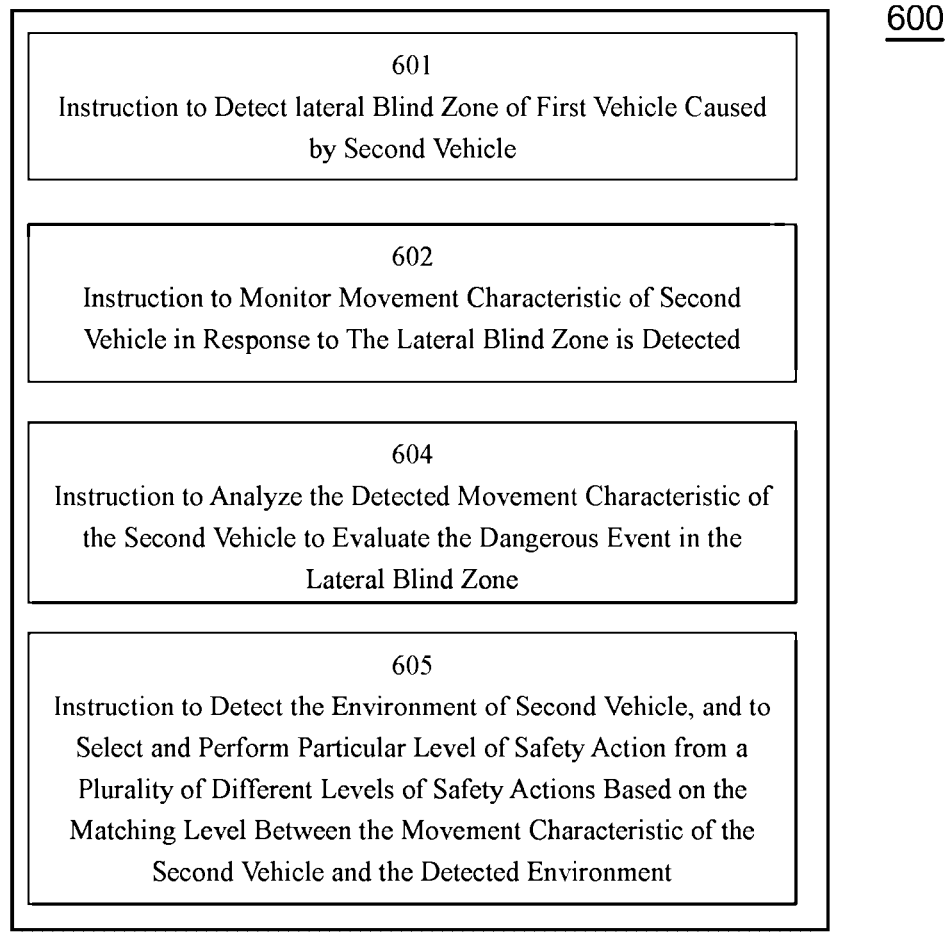

As shown in FIG. 6B, the non-transitory machine readable medium 600 according to the present disclosure may further includes instruction 604 to analyze the detected movement characteristic of the second vehicle to evaluate the dangerous event in the lateral blind zone.

As shown in FIG. 6B, the non-transitory machine readable medium 600 according to the present disclosure may further includes instruction 605 to detect the environment of the second vehicle, and to select and perform a particular level of safety action from a plurality of different levels of safety actions based on the matching level between the movement characteristic of the second vehicle and the detected environment.

Features of the examples described herein may be combined in all possible combinations of methods, apparatus, modules, systems, and machine readable medium. The modules herein may include multiple elements, any of these elements are not necessary exclusive to a particular module, different modules may share same element, such as memory, processor.

The singular form of the description such as articles "a", "an", "the" does not exclude an embodiment that includes a plurality of features. The terms "comprising" "comprising" "comprising" do not exclude other element or process.

Variations of the disclosed embodiments may be studied, understood, and implemented by those skilled in the art in light of the appended claims.

The invention claimed is:

1. A system being able to control a first vehicle to perform safety action without communication between the first vehicle and a second vehicle, comprising:
    a lateral blind zone detection module configured to detect a lateral blind zone of the first vehicle caused by the second vehicle in the lateral direction of the first vehicle;
    a movement characteristic monitor module configured to monitor movement characteristic of the second vehicle in response to the lateral blind zone is detected;
    environment matching module configured to detect a part of the environment of the second vehicle that is visible or detectable to the first vehicle and to determine a matching level between the movement characteristic of the second vehicle and the detected environment, wherein the detected part of the environment of the second vehicle comprises factors in front of the second vehicle that may cause the second vehicle to perform deceleration; and a safety action module configured to control the first vehicle to perform at least one safety action based on the matching level.

2. The system of claim 1, wherein the safety action module is configured to control the first vehicle to perform a safety action in response to at least one of:
    (1) the monitored movement characteristic is that the value of deceleration of the second vehicle exceeds a predefined deceleration threshold; or
    (2) the monitored movement characteristic is that the changing rate of the deceleration of the second vehicle exceeds a predefined changing rate.

3. The system of claim 1, wherein the safety action to be performed is selected from different levels of safety actions based on the determined matching level.

4. The system of claim 3, wherein the environment of the second vehicle comprises a movement characteristic of a third vehicle in front of the second vehicle, and the safety action module is configured to:
    (1) control the first vehicle to perform a first level of safety action, in response to the third vehicle increasing speed whereas the second vehicle does not increasing speed; or
    (2) control the first vehicle to perform a second level of safety action, in response to the second vehicle turning to decrease speed after increasing speed following the third vehicle whereas the third vehicle in front has not decrease speed.

5. The system of claim 3, further comprising an adjusting module configured to adjust the mapping between the safety actions to be performed and the monitored movement characteristic.

6. The system of claim 1, wherein the safety action comprises one or more of:
    (1) controlling the speed of the first vehicle so that the speed difference between the first vehicle and the second vehicle being within a desired difference;
    (2) controlling the speed of the first vehicle so that the first vehicle does not overtake the second vehicle;
    (3) using at least one of light, sound and vibration to alert a driver of the first vehicle;
    (4) causing the first vehicle to whistle;
    (5) flashing the high beam of the first vehicle;
    (6) flashing the double yellow light on the end of the first vehicle;
    (7) flashing the brake light of the first vehicle; and
    (8) focusing at least one resource of the first vehicle on an area adjacent to the lateral blind zone; and
    (9) allocating more resources to a detection device on the first vehicle that capable of minimizing the lateral blind zone.

7. A method for controlling a first vehicle to perform safety action without communication between the first vehicle and a second vehicle, comprising:
    detecting a lateral blind zone of the first vehicle obscured by the second vehicle in a lateral direction of the first vehicle;
    monitoring the movement characteristic of the second vehicle in response to the lateral blind zone of the first vehicle is detected;
    detecting a part of the environment of the second vehicle that is visible or detectable to the first vehicle, and determining a matching level between the movement characteristic of the second vehicle and the detected environment, wherein the detected part of the environment of the second vehicle comprises factors in front of the second vehicle that may cause the second vehicle to perform deceleration; and
    controlling the first vehicle to perform safety action based on the matching level.

8. The method of claim 7, further comprising controlling the first vehicle to perform a safety action in response to at least one of:
    (1) the monitored movement characteristic is that the value of the deceleration of the second vehicle exceeds a predefined deceleration threshold; or
    (2) the monitored movement characteristic is that the changing rate of the deceleration of the second vehicle exceeds a predefined changing rate.

9. The method of claim 8, further comprising: controlling the first vehicle to perform a safety action of deceleration such that the first vehicle does not overtake the second vehicle, in response to the second vehicle being monitored braking at a deceleration value greater than 0.7G.

10. The method of claim 7, further comprising selecting and performing a particular level of safety action from a plurality of different levels of safety actions based on the determined matching level according to a mapping between safety actions to be performed by the first vehicle and movement characteristics of the second vehicle.

11. The method of claim 10, further comprising adjusting the mapping between the safety actions and the movement characteristics based on a current setting inputted by a user or a predefined policies.

12. A non-transitory machine readable medium storing instructions thereon, wherein the instructions when executed by a processor, causing the processor to:
    detecting a lateral blind zone of a first vehicle obscured by a second vehicle in a lateral direction of the first vehicle;
    monitoring movement characteristic of the second vehicle in response to the lateral blind zone of the first vehicle is detected;
    detecting a part of the environment of the second vehicle that is visible or detectable to the first vehicle, and determining a matching level between the movement characteristic of the second vehicle and the detected environment, wherein the detected part of the environment of the second vehicle comprises factors in front of the second vehicle that may cause the second vehicle to perform deceleration; and
    controlling the first vehicle to perform safety action based on the matching level.

13. The non-transitory machine readable medium of claim 12, wherein the set of instructions further comprises instruction that, when executed by the processor, cause the processor to: select and perform a particular level of safety action from a plurality of different levels of safety actions based on the determined matching level.

* * * * *